(12) United States Patent
Kikuchi et al.

(10) Patent No.: US 6,282,000 B1
(45) Date of Patent: Aug. 28, 2001

(54) OPTICAL TRANSMITTING AND RECEIVING MODULE

(75) Inventors: Kimihiro Kikuchi; Yoshihiro Someno; Atsunori Hattori; Shoichi Kyoya, all of Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/127,390

(22) Filed: Jul. 31, 1998

(30) Foreign Application Priority Data

Aug. 4, 1997 (JP) .................................... 9-209179

(51) Int. Cl.[7] .................................................. H04B 10/00
(52) U.S. Cl. ........................ 359/152; 359/159; 359/153
(58) Field of Search ................................ 359/152, 153; 385/14, 89, 93, 92; 257/79, 80

(56) References Cited

U.S. PATENT DOCUMENTS

| 5,408,559 | 4/1995 | Takahashi et al. ............... 385/89 |
| 5,552,918 | * 9/1996 | Krug et al. ..................... 359/152 |
| 5,663,821 | 9/1997 | Suda et al. ..................... 359/152 |
| 5,867,622 | * 2/1999 | Miyasaka et al. ............... 385/88 |
| 6,040,934 | * 3/2000 | Ogusu et al. ................... 359/152 |
| 6,075,635 | * 6/2000 | Butrie et al. ................... 359/159 |
| 6,106,160 | * 8/2000 | Kikuchi et al. .................. 385/88 |

FOREIGN PATENT DOCUMENTS

| 0 238 977 A2 | 3/1987 | (JP) . |
| 63017408 | 1/1988 | (JP) . |
| 0 706 069 A1 | 4/1996 | (JP) . |
| 0 715 195 A1 | 6/1996 | (JP) . |
| 08234061 | 9/1996 | (JP) . |

\* cited by examiner

Primary Examiner—Leslie Pascal
Assistant Examiner—Dalzid Singh
(74) Attorney, Agent, or Firm—Brinks Hofer Gilson & Lione

(57) ABSTRACT

In an optical transmitting and receiving module, a transmitting light beam having a wavelength λ1 emitted from an light-emitting device passes through an optical demultiplexing filter and enters an optical fiber, and a receiving light beam emitted from an end face of the optical fiber is reflected from the optical demultiplexing filter and is incident on a light-receiving device. A cover for covering the front space of the optical demultiplexing filter is placed on a casing block, and a tongue piece serving as a returning-light preventing unit is formed on the cover. When a transmitting light beam emitted from the light-emitting device is reflected from the optical demultiplexing filter, the direction in which the reflected light advances is changed by the tongue piece so that the reflected light is not incident on the light-receiving device.

6 Claims, 3 Drawing Sheets

US 6,282,000 B1

OPTICAL TRANSMITTING AND RECEIVING MODULE

BACKGROUND OF THE INVENTION

1. Field of the Invention

The present invention relates to an optical transmitting and receiving module for coupling a light emitting device and a light receiving device with an optical fiber through which a plurality of transmitting light beams and receiving light beams having different wavelengths are transferred.

2. Description of the Related Art

FIG. 5 is a cross section of a conventional optical transmitting and receiving module. As shown in the figure, the casing of this optical transmitting and receiving module can be roughly divided into four blocks, a center block 1, a laser diode (LD) block 2, a photodiode (PD) block 3, and a fiber block 4. Inside the center block 1, an optical demultiplexing filter 5 is mounted. A laser diode (LD) 6 serving as a light emitting device and a lens holder 8 for holding a lens 7 are mounted in the LD block 2. A photodiode (PD) 9 serving as a light receiving device and a lens holder 11 for holding a lens 10 are mounted in the PD block 3. An optical fiber 12 and a lens holder 14 for holding a lens 13 are mounted in the fiber block 4.

A transmitting light beam having a wavelength $\lambda 1$ emitted from the LD 6 is made parallel by the lens 7 in the LD block 2, passes through the optical demultiplexing filter 5 in the center block 1, is collected by the lens 13 in the fiber block 4, enters an end face of the optical fiber 12, and is transmitted through the optical fiber 12. On the other hand, a receiving light beam having a wavelength $\lambda 2$ transmitted through the optical fiber 12 is diffused at the end face of the optical fiber 12, is made parallel by the lens 13 in the fiber block 4, is reflected from the optical demultiplexing filter 5, is collected by the lens 10 in the PD block 3, and is received by the PD 9.

In the above-described conventional optical transmitting and receiving module, ideally, the optical demultiplexing filter 5 has an optical demultiplexing characteristic in which only a transmitting light beam having the wavelength $\lambda 1$ emitted from the LD 6 is passed. Since a part of the transmitting light beam having the wavelength $\lambda 1$ is actually reflected, the reflected light beam is irregularly reflected at inside walls of the center block 1, passes through the optical demultiplexing filter 5, and undesirably enters the light receiving surface of the PD 9. When the transmitting light beam is detected by the PD 9 in this way, the S/N ratio of a receiving signal deteriorates.

SUMMARY OF THE INVENTION

Accordingly, it is an object of the present invention to provide an optical transmitting and receiving module which prevents a transmitting light beam emitted from a light-emitting device and reflected from an optical demultiplexing filter from being undesirably incident on the light-receiving surface of a light-receiving device after passing through the optical demultiplexing filter.

The foregoing object is achieved according to the present invention through the provision of an optical transmitting and receiving module provided with returning-light preventing means for preventing light from returning to a light-receiving device, wherein, in one casing block, a light-emitting device for emitting a transmitting light beam, a first lens for collimating the transmitting light beam emitted from the light-emitting device, an optical demultiplexing filter for passing the light beam collimated by the first lens, and a second lens for collecting the light passing through the optical demultiplexing filter at an end face of an optical fiber are coaxially disposed; a third lens for collecting a receiving light beam emitted from the end face of the optical fiber, collimated by the second lens, and reflected from the optical demultiplexing filter, and a light-receiving device for receiving the light collected by the third lens are disposed; a cover for covering the front space of a mounting surface for mounting the optical demultiplexing filter is placed on the casing block; and the cover is provided with returning-light preventing means for preventing the transmitting light beam reflected from the optical demultiplexing filter from reaching the light-receiving device after passing through the optical demultiplexing filter.

When the optical transmitting and receiving module is formed as described above, in the transmitting light beam having the wavelength $\lambda 1$ emitted from the light-emitting device, since the reflected light reflected from the optical demultiplexing filter advances in a direction changed by the returning-light preventing means of the cover, it hardly occurs that the transmitting light beam having the wavelength $\lambda 1$ is undesirably incident on the light-receiving surface of the light-receiving device, and the S/N ratio of a receiving signal is increased.

In the optical transmitting and receiving module, a tongue piece formed by cutting and folding a part of the cover may serve as the returning-light preventing means.

The tongue piece, formed by cutting and folding a part of the cover, can be easily manufactured by pressing a metal plate. In addition, it is expected that a returning-light preventing effect is positively obtained by adjusting the angle at which the tongue piece is folded.

As the returning-light preventing means, an unreflecting, absorbing material may be used. For example, an unreflecting, absorbing material is attached inside the cover and the material absorbs a transmitting light beam having the wavelength $\lambda 1$ reflected from the optical demultiplexing filter. Alternatively, an uneven surface may be used. An uneven surface is formed inside the cover, and a transmitting light beam having the wavelength $\lambda 1$ reflected from the optical demultiplexing filter is irregularly reflected from the uneven surface so that the reflected light does not return to the optical demultiplexing filter.

In the optical transmitting and receiving module, a label for securing the cover may be wound around the casing block so as to seal a hole formed in the cover by the tongue piece.

When the label for securing the cover is wound around the casing block so as to seal the hole formed around the tongue piece, the label also serves as cover securing means and a dust-proof effect of the cover is improved.

The receiving light reflected from the optical demultiplexing filter can be received by the light-receiving device by collecting it with the third lens. When the receiving light reflected from the optical demultiplexing filter is led to the third lens through a reflecting member in order to place the light-emitting device and the light-receiving device on the same plane in the casing block, the optical transmitting and receiving module can be easily mounted on a printed circuit board.

The casing block may be formed by cutting a metal material. It can be formed with a metal die such as a die-cast.

DESCRIPTION OF THE PREFERRED EMBODIMENT

Figure 1:
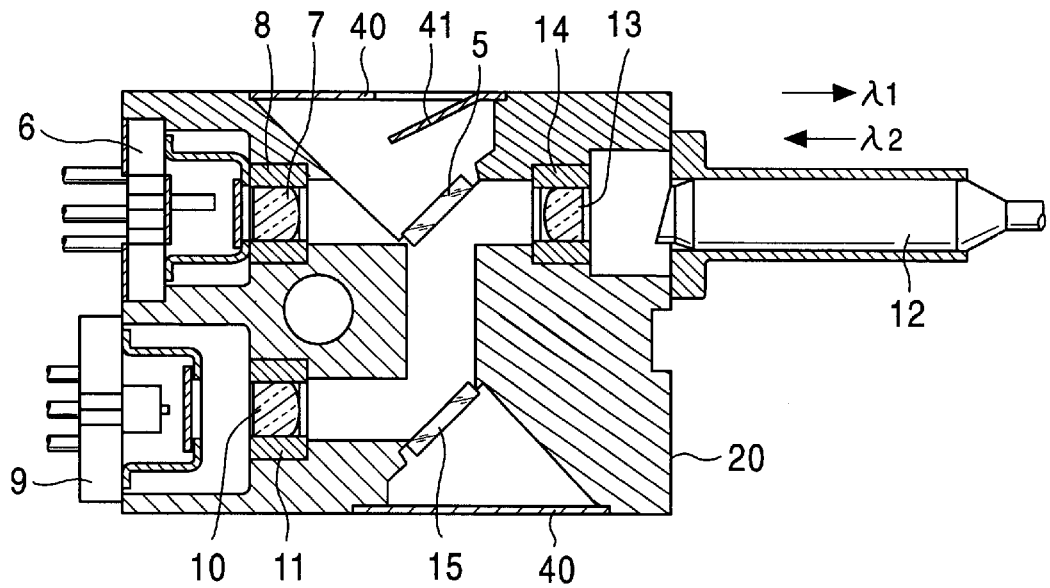
FIG. 1 is a cross section of an optical transmitting and receiving module according to an embodiment of the present invention.
Figure 2:
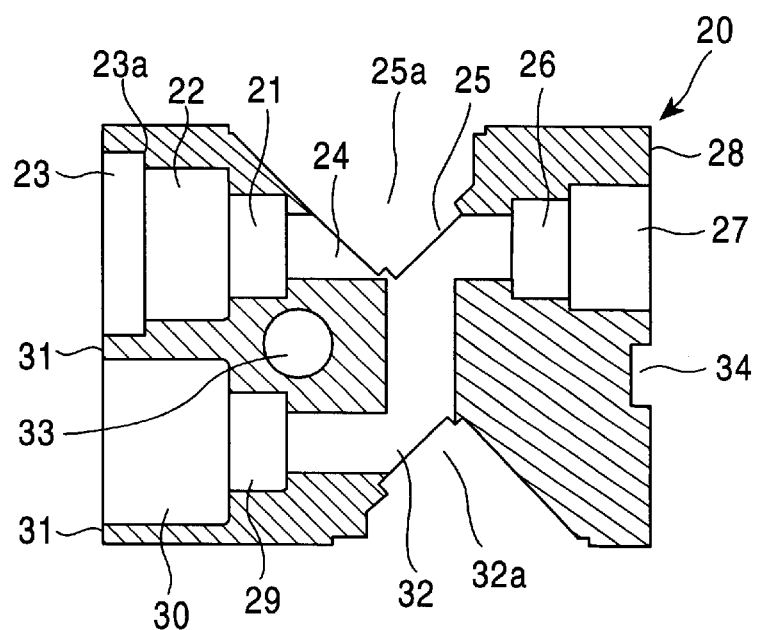
FIG. 2 is a cross section of a casing block of the optical transmitting and receiving module.
Figure 3:
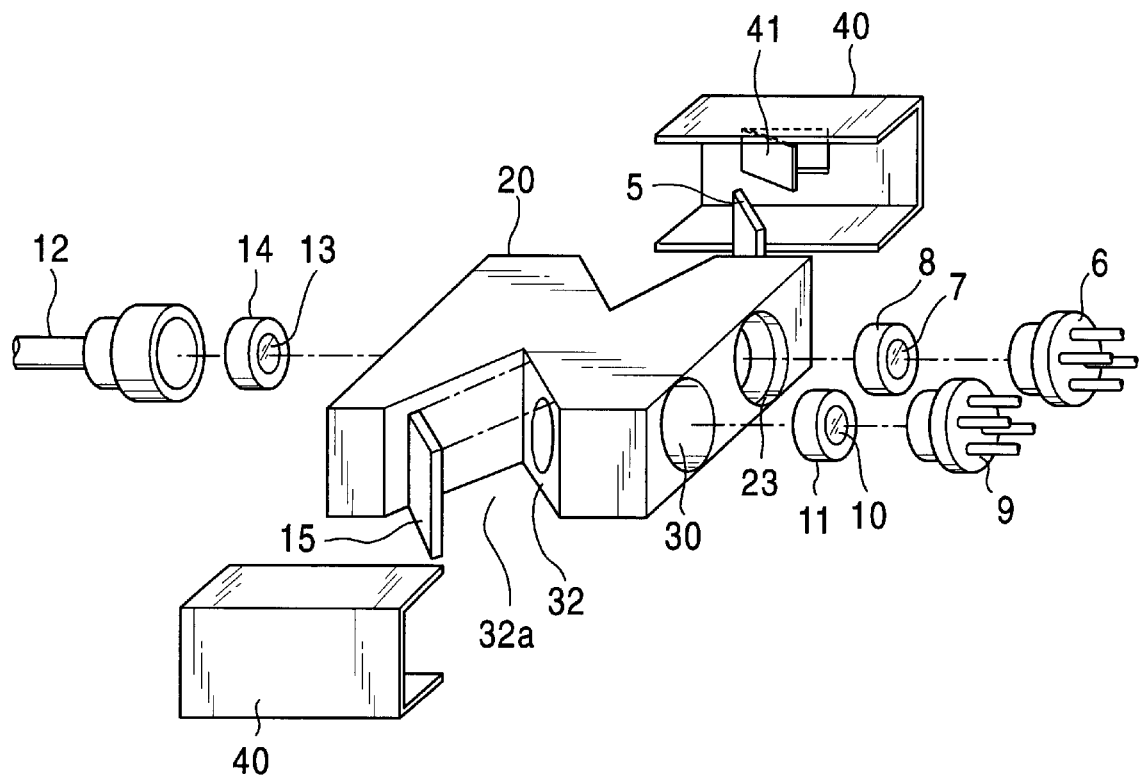
FIG. 3 is an exploded perspective view of the optical transmitting and receiving module.
Figure 4:
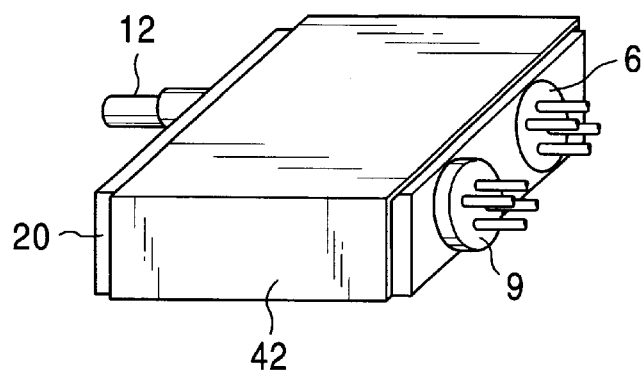
FIG. 4 is a perspective view of the optical transmitting and receiving module.
Figure 5:
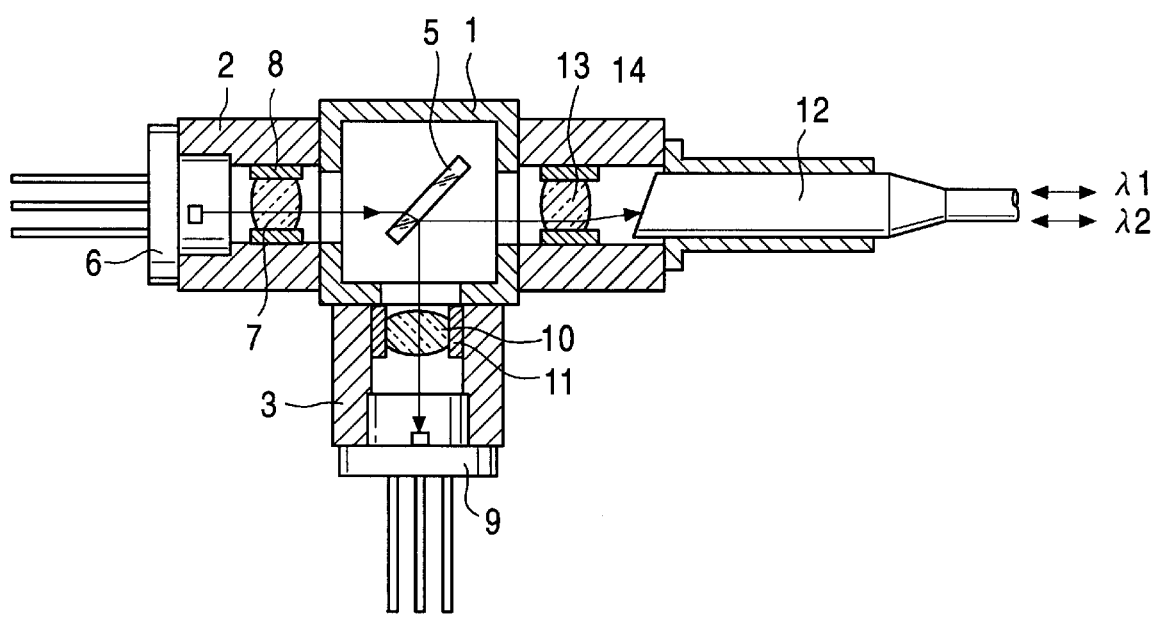
FIG. 5 is a cross section of a conventional optical transmitting and receiving module.

An embodiment of the present invention will be described below by referring to the drawings. FIG. 1 is a cross section of an optical transmitting and receiving module according to an embodiment of the present invention. FIG. 2 is a cross section of a casing block provided for the optical transmitting and receiving module. FIG. 3 is an exploded perspective view of the optical transmitting and receiving module, and FIG. 4 is a perspective view of the optical transmitting and receiving module. The same reference symbols as those used in FIG. 5 are assigned to the components corresponding to those in FIG. 5.

As shown FIGS. 1 to 3, the optical transmitting and receiving module according to the present embodiment has one casing block 20. To this casing block 20, an LD 6, a lens holder 8 for holding a lens 7, an optical demultiplexing filter 5, a lens holder 14 for holding a lens 13 in a transmission path, and an optical fiber 12, all of which were described for the conventional module, are mounted coaxially. In parallel to this optical axis, a reflecting mirror 15 for a receiving light beam, a lens holder 11 for holding a lens 10, and a PD 9 are coaxially mounted to the casing block 20. Instead of the reflecting mirror 15, an optical demultiplexing filter which can reflect a light beam having a wavelength λ2 may be used.

As shown in FIG. 2 in detail, in the casing block 20, an opening 21 for placing the lens holder 8, an opening 22 for placing an LD (6) body, a mounting hole 23 for placing an LD (6) flange, and an opening 24 for the optical path are continuously formed. The inside bottom surface 23a of the mounting hole 23 serves as the mounting reference surface of the LD 6. The LD 6 is welded to the casing block 20 such that its flange is butted against the inside bottom surface 23a of the mounting hole 23. The whole LD (6) flange fits in the inside of the mounting hole 23, and only a lead section is exposed at a side face 31 of the casing block 20. The casing block 20 is also provided with a mounting surface 25 for mounting the optical demultiplexing filter 5 coaxially with the openings 21, 22, and 24 disposed at the light-emitting side and at an angle of 45 degrees against the optical axis, an opening 26 for placing the lens holder 14, and an opening 27 for an optical path. The optical fiber 12 is mounted to a side face 28 of the casing block 20. The casing block 20 is further provided, in parallel to the openings 21, 22, and 24 disposed at the light-emitting side, with an opening 29 for placing a lens holder 11, an opening 30 for placing a PD (9) body, and a mounting surface 32 for mounting the reflecting mirror 15 at an angle of 45 degrees against the optical axis. The side face 31 of the casing block 20 serves as the mounting reference surface of the PD 9. The PD 9 is welded to the casing block 20 such that its flange is butted against the side face 31. This means that the PD 9 is mounted to the casing block 20 such that the flange and lead section of the PD 9 are exposed at the side face 31. The LD 6 is mounted to the casing block 20 at the position, closer to the center than that of the PD 9 by the thickness of the PD (9) flange.

The front spaces of the mounting surface 25 for mounting the optical demultiplexing filter 5 and the mounting surface 32 for mounting the reflecting mirror 15 are largely open. Notches 25a and 32a corresponding to these open spaces are formed in the casing block 20. These notches 25a and 32a are covered by a pair of covers 40 put on the casing block 20. A cover 40 for the notch 25a is provided with a tongue piece 41 serving as returning-light preventing means. The covers 40 are produced by pressing a metal sheet. A part of a cover 40 is cut in a U shape with two right angles at the bottom and the connecting section is folded toward inside at a specified angle to form the tongue piece 41. The casing block 20 is also provided with a screw hole 33 and an engagement groove 34. The screw hole 33 is for a screw (not shown) for securing the optical transmitting and receiving module to a chassis or a printed circuit board of an electric unit. The engagement groove 34 is used for preventing the optical transmitting and receiving module from rotating when the module is secured with a screw.

The casing block 20 having such a shape is formed by cutting a metal member such as a stainless member. Since the front spaces of the mounting surface 25 for mounting the optical demultiplexing filter 5 and the mounting surface 32 for mounting the reflecting mirror 15 are largely open due to the notches 25a and 32a, there is no obstacle to a cutting tool used for forming the mounting surfaces 25 and 32, and the mounting surfaces 25 and 32 can be easily machined with high precision. Since the side face 31, which serves as the mounting reference surface of the PD 9, is an outside surface of the casing block 20, there is no obstacle to a cutting tool used for cutting the side face 31, and the mounting reference surface of the PD 9 can also be easily machined with high precision. Instead of cutting, a metal die such as a die-cast may be used to produce the casing block 20. Also in this case, since the metal-die shape corresponding to the mounting surfaces 25 and 32 and the side face 31 is simplified, the mounting reference surfaces for the optical demultiplexing filter 5, the reflecting mirror 15, and the PD 9 can be easily made with high precision.

To assemble the optical transmitting and receiving module configured as described above, the optical demultiplexing filter 5, the LD 6, the lens holder 8, and the lens holder 14 are secured on the optical path at the light-emitting side, the optical path of the optical fiber 12 is adjusted such that a transmitting light beam (having the wavelength λ1) from the LD 6 is incident on an end face of the optical fiber 12 at the correct optical path through the lens 7, the optical demultiplexing filter 5, and the lens 13, and the optical fiber 12 is secured by welding. Then, the lens holder 11 and the reflecting mirror 15 are secured on the optical path at the light-receiving side of the casing block 20, the optical path of the PD 9 is adjusted such that a receiving light beam (having the wavelength λ2) emitted from the end face of the optical fiber 12 is incident on the light-receiving surface of the PD 9 at the correct optical path through the lens 13, the optical demultiplexing filter 5, the reflecting mirror 15, and the lens 10, and the PD 9 is secured by welding. The pair of covers 40 is placed on the casing block 20 so as to cover the notches 25a and 32a. A label 42 is wound on both covers 40 as shown in FIG. 4 to secure the covers 40 to the casing block 20. Assembling of the optical transmitting and receiving module has been completed.

The optical transmitting and receiving module is used in the following manner. A transmitting light beam having the wavelength λ1 emitted from the LD 6 is made parallel by the lens 7, passes through the optical demultiplexing filter 5, is collected by the lens 13, enters an end face of the optical fiber 12, and is transmitted through the optical fiber 12. On the other hand, a receiving light beam having the wavelength λ2 transmitted through the optical fiber 12 is diffused at the end face of the optical fiber 12, is made parallel by the lens 13, is reflected from the optical demultiplexing filter 5, is reflected from the reflecting mirror 15, is collected by the lens 10, and is received by the PD 9. In the transmitting light beam having the wavelength λ1 emitted from the LD 6, since the light reflected from the optical demultiplexing filter 5 advances in a direction changed by the tongue piece 41 of the cover 40 so as not to return to the optical demultiplexing filter 5, it hardly occurs that the transmitting light beam having the wavelength λ1 is undesirably incident on the light-receiving surface of the PD 9 through the optical demultiplexing filter 5, and the S/N ratio of a receiving signal can be increased.

In the foregoing embodiment, the LD 6 and the PD 9 are disposed on the same surface, the side face 31, in the casing block 20. It may be possible that the reflecting mirror 15 is removed, and the PD 9 and the lens holder 11 for holding the lens 10 are disposed on another side face (the lower surface in FIG. 1) which is perpendicular to the side face 31 in the casing block 20.

What is claimed is:

1. An optical transmitting and receiving module provided with a returning-light preventing means, comprising:

a casing block;

a light-emitting device for emitting a transmitting light beam, a first lens for collimating the transmitting light beam emitted from the light-emitting device, an optical demultiplexing filter for passing the light beam collimated by the first lens, and a second lens for collecting the light passing through the optical demultiplexing filter at an end face of an optical fiber, said light-emitting device, said first lens, and said second lens being coaxially disposed in said casing block;

a third lens for collecting a receiving light beam emitted from the end face of the optical fiber, collimated by the second lens, and reflected from the optical demultiplexing filter, and a light-receiving device for receiving the light collected by the third lens, said third lens and said light-receiving device being disposed in said casing block; and a cover for covering a front space adjacent to a mounting surface on said casing block, said mounting surface being provided for mounting the optical demultiplexing filter on the casing block, wherein the cover is provided with the returning-light preventing means for preventing the transmitting light beam reflected from the optical demultiplexing filter from reaching the light-receiving device, said returning-light preventing means comprising a tongue piece formed by cutting and folding a part of the cover.

2. An optical transmitting and receiving module according to claim 1, wherein a label for securing the cover is wound around the casing block so as to seal a hole formed in the cover by the tongue piece.

3. An optical transmitting and receiving module according to claim 1, further comprising a reflecting mirror for reflecting the receiving light beam reflected from the optical demultiplexing filter towards the third lens, said reflecting mirror being mounted on a second mounting surface on said casing block.

4. An optical transmitting and receiving module according to claim 3, further comprising a second cover for covering a rear space adjacent to the second mounting surface.

5. An optical transmitting and receiving module according to claim 1, wherein the tongue piece is disposed so as to project into the front space.

6. An optical transmitting and receiving module according to claim 1, wherein the module comprises a generally parallelepiped shape.

* * * * *